United States Patent Office 3,407,017
Patented Oct. 22, 1968

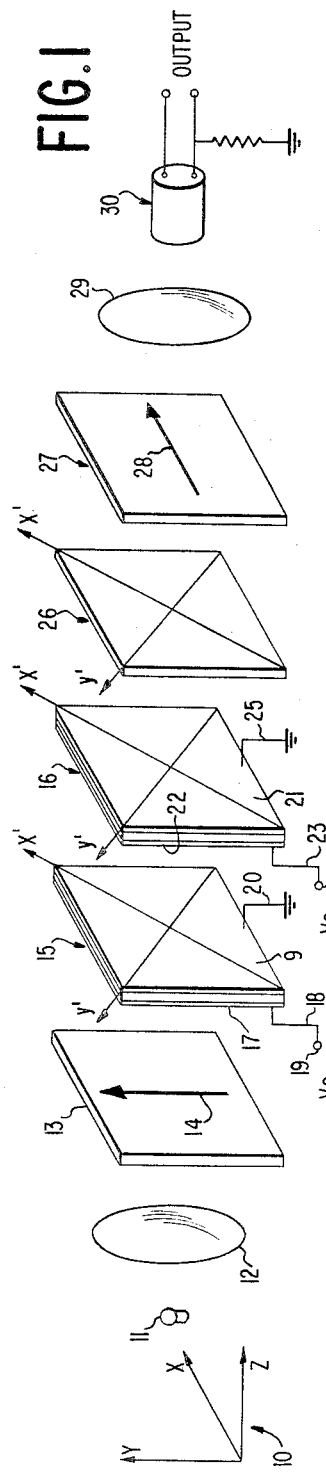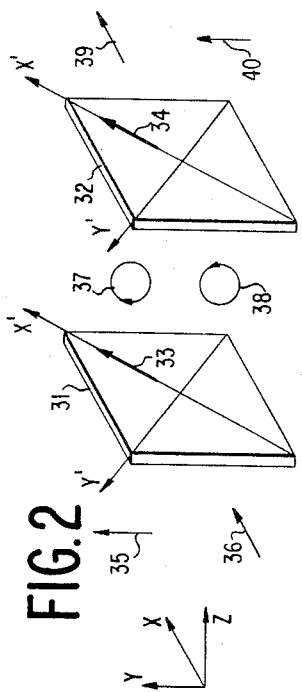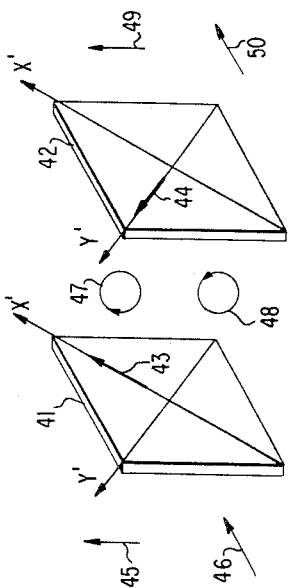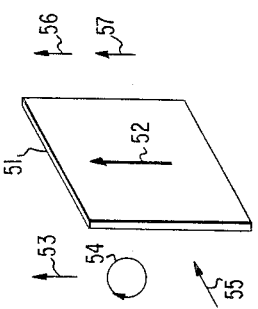

3,407,017
ELEMENT FOR OPTICAL LOGIC
Harold Fleisher, Poughkeepsie, and Kurt M. Kosanke, Wappingers Falls, N.Y., assignors to International Business Machines Corporation, New York, N.Y., a corporation of New York
Filed June 29, 1964, Ser. No. 378,680
5 Claims. (Cl. 350—150)

ABSTRACT OF THE DISCLOSURE

Variable logic functions can be generated by an electro-optic device which varies the polarization of incident light in dependence upon the logical inputs and passes to an intensity detector light having an intensity dependent upon the input responsive polarization variation. A pair of crystals of electro-optic active material are positioned along the transmission path and operate as quarter wave plates when the logical inputs are applied thereto. The orientation of the optical axes of the crystals are such that the output light from the combination will be right or left circularly polarized or plane polarized in a first or second direction depending upon the logical combination of the inputs.

---

The invention relates to electro-optical logic devices. More specifically, the invention concerns an element for electro-optic logic which by proper arrangement can be used to generate numerous logical functions.

Prior art electro-optic logic devices have used a combination of polarizers, analyzers, and phase retardation plates, for obtaining a desired logical function. The prior art devices usually comprise a light source arranged to propagate light through various optical elements, and a photomultiplier tube or other light responsive device positioned to receive the light wave after it passes through all of the optical elements. Some of the optical elements are of the electro-optic active type. These elements have different effects on the light passing therethrough, depending on whether or not a voltage is applied to these elements. With no voltage applied, the electro-optic active element will pass the light therethrough without affecting in any substantial manner, the light intensity or polarization. If a voltage is applied to an electro-optic element, light which is transmitted therethrough will be affected by having its plane of polarization rotated.

Generally, the prior art electro-optic logic devices have been arranged so that the electro-optic elements act as light gates. That is, each electro-optic active element in combination with a polarizer acts to either pass a light wave or block a light wave. The voltage bias on the active element may be set so that the light wave will be passed when there is no voltage and will be blocked when there is a positive voltage, or, if preferred, the bias may be set so that the light will be blocked when there is no voltage and passed when there is a positive voltage. The logical OR, AND, and other similar functions, have been generated by providing combinations of these light gates.

The present invention is more adaptable than the prior art electro-optical logic circuits to generate numerous logic functions due to the novel placement of the electro-optic active crystals in the light propagation path. Whereas in the prior art devices, the electro-optic active crystals were separated by a polarizer or analyzer, in the invention disclosed herein the propagated light passes directly between the electro-optic active elements. This allows each electro-optic active element to act other than as light gates which only pass or block light. It is because of the arrangement of elements, as will better be understood by the explanation to follow, that the invention is adaptable to generate numerous logic functions. For example, without changing the magnitude of the voltage inputs which are applied to the electro-optic active elements of the invention, the basic arrangement of the invention is capable of performing any type of logic which a two-input device can possibly perform. A change in the logical function generated may be brought about by merely rotating one or a combination of the optical elements.

In the present invention, light waves from a monochromatic light source are propagated through a serial arrangement of optical elements comprising; a polarizer, two electro-optic active crystals, a quarter wave plate, and an analyzer. The light is detected by a photomultiplier tube or similar detector having a predetermined intensity threshold level. The logic inputs, commonly described as binary ones and zeros, are applied as voltages to the two electro-optic active crystals. When no voltage is applied to an electro-optic active crystal, the crystal has no effect on the light passing therethrough. When the proper voltage, $V\lambda/4$, is applied to the active crystal, the crystal acts as a quarter wave plate and substantially affects the polarization of the light which passes therethrough.

It is therefore a principal object of the invention to provide a logic circuit utilizing optical elements and adaptable to generate numerous logic functions.

It is a further object of the invention to provide a simple logic circuit easily adaptable to generate different logical functions by rotation of the optical elements.

Other objects of the invention will be pointed out in the following description and claims and illustrated in the accompanying drawings, which disclose, by way of example, the principles of the invention and the best mode, which has been contemplated, of applying the principle.

In the drawings:

FIGURE 1 is an embodiment of the electro-optic logic circuit of the invention;

FIGURES 2 and 3 are diagrams of quarter wave plates, helpful in understanding how the active elements and the quarter wave plate of FIGURE 1 affect light waves which are propagated therethrough;

FIGURE 4 is an illustration of a polarizer, helpful in understanding the polarizer and analyzer of FIGURE 1;

FIGURE 5 is a chart which depicts in tabular form examples of the logic capabilities, in form of polarization status, of the apparatus shown in FIGURE 1.

Referring to FIGURE 1, numeral 10 indicates an XYZ rectangular coordinate system. Light which is plane polarized is considered to be polarized in either the X direction or the Y direction, and is propagated in the Z direction. The basic, logic circuit of the invention includes a monochromatic light source 11, a lens 12, polarizer 13, electro-optic active crystals 15 and 16, quarter wave plate 26, analyzer 27, lens 29, and photomultiplier tube 30. Arrow 14 on polarizer 13 indicates that the transmission direction of polarizer 13 is in the Y direction. For ease of explanation, throughout the specification, Y=1, for a polarizer or analyzer, means that the transmission direction of the polarizer or analyzer is in the Y direction; X=1 means the transmission direction of the polarizer or analyzer is in the X direction. For example, Y=1 for polarizer 13 and X=1 for analyzer 27. Active crystal 15 has applied thereto transparent electrodes 17 and 9. Electrode 9 is connected to ground by lead 20, and electrode 17 is connected to input 19 via lead 18. Active crystal 16 has applied thereto transparent electrodes 21 and 22. Electrode 21 is connected to ground by lead 25, and electrode 22 is connected to input 24 via lead 23. Compounds which are suitable for forming the active crystals of the invention are ammonium dihydrogen phosphate, potassium dihydrogen phosphate, potassium dideuterium phosphate, and cuprous chloride.

Before explaining the operation of the logic circuit of FIGURE 1, reference is had to FIGURES 2 through 4 which illustrate the effect of certain of the optical elements upon propagated light. In FIGURES 2 through 4, a vertical arrow is indicative of a plane polarized light wave which has its plane of polarization in the Y direction, a horizontal arrow is indicative of a plane polarized light wave having its plane of polarization in the X direction, and a circle with an arrowhead on it is indicative of a circularly polarized light wave. Light propagation is considered to be in the +Z direction.

In FIGURE 2, there are shown two quarter wave plates, 31 and 32, similar to the quarter wave plate 26 shown in FIGURE 1. Since active crystals 15 and 16 of FIGURE 1 act as quarter wave plates when voltages are applied thereto, FIGURE 2 is explanatory of the effect on propagated light waves, of energized crystals 15 and 16, as well as quarter wave plate 26.

As is well known in the art, a quarter wave plate properly oriented acts upon plane polarized light waves passing therethrough to phase retard by 90° the wave polarization in one direction with respect to the wave polarization in a different direction. Quarter wave plate 31 is arranged so that the wave polarization in the X' direction is phase retarded with respect to the wave polarized in the Y' direction. Arrow 33 indicates that the relative retardation occurs in the X' transmission direction. The quarter wave plates have the following effect on light transmitted therethrough: arrow 35 indicates a light wave of plane polarization in the Y direction which is being propagated in the Z direction. As the light passes through quarter wave plate 31, it emerges as a right-handed circularly polarized wave 37. As circularly polarized wave 37 is transmitted through quarter wave plate 32, it emerges as a plane polarized wave 39 having its plane of polarization in the X direction. Quarter wave plate 32 is arranged to be additive with quarter wave plate 31, that is, both quarter wave plates have relative phase retardation in the X' direction. For ease of explanation, a quarter wave plate which has a relative phase retardation in the X' direction will be called a quarter wave plate having $X'=\phi$ and $Y'=0$. A quarter wave plate which has a relative phase retardation in the Y' direction will be designated as a quarter wave plate having $Y'=\phi$ and $X'=0$.

As another example, still referring to FIGURE 2, to show the effect of quarter wave plates 31 and 32 upon propagated light waves, it is assumed that plane polarized wave 36 is to be propagated through the two quarter wave plates. Wave 36 is polarized in the X direction, and upon passing through quarter wave plate 31 becomes left-handed circularly polarized as indicated at 38. Further propagation through quarter wave plate 32 causes the wave to be plane polarized in the Y direction as indicated at 40.

FIGURE 3 shows two quarter wave plates 41 and 42 which are similar to the quarter wave plates of FIGURE 2 except that they are oriented to cancel one another. Quarter wave plate 41, as indicated by arrow 43, is of the characteristic $X'=\phi$, $Y'=0$. Quarter wave plate 42, as indicated by arrow 44, is of the characteristic $X'=0$, $Y'=\phi$.

A plane wave polarized in the Y direction, indicated as 45, passes through quarter wave plate 41 and becomes right-handed circularly polarized, as indicated at 47. The wave continues through quarter wave plate 42 and becomes plane polarized in the Y direction as indicated at 49. A plane wave polarized in the X direction, as shown at 46, propagates through quarter wave plate 41 and is lefthanded circularly polarized, as shown at 48. The wave continues through quarter wave plate 42 and is plane polarized with its plane of polarization in the X direction as shown at 50. Thus it can be seen that the light passing out of the second quarter wave plate 42, is substantially the same as the light passing into the first quarter wave plate 41, and the quarter wave plates have a cancelling effect.

The quarter wave plates shown in FIGURE 2 may be arranged to have a cancelling effect, similar to that shown in FIGURE 3, by simply rotating either quarter wave plate 31 or quarterwave plate 32. As an illustrative example, quarter wave plate 32 could be rotated so that arrow 34 points in the Y' direction.

FIGURES 2 and 3 are illustrative not only of the action of quarter wave plate 26, shown in FIGURE 1, but are also illustrative of the action of active crystals 15 and 16, when those active crystals are supplied with voltage inputs. When there is no voltage input to an active crystal, the crystal passes a light wave without having an effect on it.

In FIGURE 4, 51 designates a polarizer or analyzer such as is well known in the art. Arrow 52 indicates that $Y=1$ for polarizer 51. For a polarizer or analyzer which has a transmission direction in the Y direction, only waves which are polarized in the Y direction will pass therethrough. Thus, a wave 53 will pass through polarizer 51 as indicated by arrow 56. Since a circularly polarized wave has a component in the Y direction, there will be an output 57, when an input 54 is applied to polarizer 51. Assuming that light waves 53 and 54 are of the same intensity, light wave 57 will be only half the intensity of light wave 56. A plane wave polarized in the X direction, as shown at 55, has no component in the Y direction and will be totally blocked by polarizer 51.

Referring now to FIGURES 1 and 5, the operation of FIGURE 1 will be explained. The table of FIGURE 5 is indicative of only a few of the logical functions generated by the circuit of FIGURE 1. A more complete table is listed below in the specification. The table of FIGURE 5 is read as follows:

For row A, polarizer 13 is of the type $Y=1$, $X=0$. This means the transmission direction of polarizer 13 is in the Y direction. Both electro-optic active crystals 15 and 16 are oriented so that $X'=\phi$ and $Y'=0$. The quarter wave plate 26 is oriented so that $X'=\phi$ and $Y'=0$. The far right-hand column of the table in FIGURE 5 indicates the polarization of the wave which is applied as an input to wave analyzer 27. That column indicates that when there is no voltage applied to crystals 15 and 16 the wave applied to analyzer 27 will be right-handed circularly polarized. When there is no voltage applied to crystal 15, and voltage Vλ/4 is applied to crystal 16, the light wave applied to analyzer 27 will be plane polarized in the X direction.

By way of example, it is assumed that polarizer 13, crystals 15 and 16, and quarter wave plate 26 are oriented in the manner designated by row A. Also assume that a voltage Vλ/4 is applied at input 19, and a voltage Vλ/4 is applied at input 24. Monochromatic light emanates from light source 11 and is directed by lens 12 onto polarizer 13. The light passing through polarizer 13 will be vertically polarized. Since crystal 15 is active, and $X'=\phi$, the vertically polarized light which is applied to the input face of crystal 15 becomes right-handed circularly polarized. Since crystal 16 is active, and $X'=\phi$, the circularly polarized wave which is applied to the input face of crystal 16 becomes plane polarized in the X direction. The plane polarized wave in the X direction is applied to the input face of quarter wave plate 26. Since for quarter wave plate 26, $X'=\phi$, the output of quarter wave plate 26 is a left-handed circularly polarized wave. Thus, a circularly polarized wave is applied to the analyzer 27. Looking at the far right-hand column in row A, of Table V, it is seen that when 15 is 1 and 16 is 1 the input to the wave analyzer 27 is a circularly polarized wave. (The designation 15 is 1 means that a voltage Vλ/4 is applied at input 19 so that crystal 15 is active.)

For another example, it is assumed that the optical elements are oriented in accordance with row C of FIGURE 5. That is, for polarizer 13, $Y=1$; for crystal 15, $X'=\phi$; for crystal 16, $Y'=\phi$; for quarter wave plate 26, $X'=\phi$. Also assume that 15 is 0 and 16 is 1. Light emanating from monochromatic light source 11 passes through polarizer 13 and is polarized in the Y direction. Since no voltage is applied to active crystal 15, the light which is polarized in the Y direction passes therethrough without any substantial change. Active crystal 16 is active due to the fact that a voltage $V\lambda/4$ is applied at input 24. Since crystal 16 is oriented so that $Y'=\phi$, and since quarter wave plate 26 is oriented so that $X'=\phi$, these two plates have a cancelling effect on one another so that the output light from plate 26 is vertically polarized. Thus, the light which is applied as an input to analyzer 27 is vertically polarized. This is shown in the far right column of row C, FIGURE 5.

The table in FIGURE 5 shows only the polarization of light waves presented to analyzer 27 due to different arrangements of the optical elements. From these different polarization states of the light waves numerous logical functions may be generated simply by choosing the transmission direction 28 of the analyzer 27 and by setting the threshold of the photomultiplier tube, 30, or any other photosensitive device at different levels. A complete table of the logical functions which may be generated by the arrangement shown in FIGURE 1, is given below:

30 will be of intensity I. If the light presented to analyzer 27 is either right- or left-handed circularly polarized, the light presented to photomultiplier tube 30 will have an intensity equal to $I/_2$. When the light presented to analyzer 27 is plane polarized in the Y direction, there will be no light passing through analyzer 27.

The logical functions generated by the circuit of FIGURE 1 are given in the above table in terms of the intensity of the light applied to the photomultiplier tube 30, in the column labeled "Intensity Functions." For example, in row A under the column heading "Intensity Function," when no voltage is applied to the active crystals, the light applied to photomultiplier tube 30 is of intensity $I/_2$. By using two different photomultiplier tubes, or by using one photomultiplier tube and changing its threshold level, the logical functions A and B will be generated. That is, if the photomultiplier tube is arranged to have a threshold level T such that $0<T<I/_2$, the logical functions shown in column A of the above table will be generated. If the photomultiplier tube has a threshold level T such that $I/_2<T<I$, the logical functions generated will be those shown in column B.

Thus, it can be seen that the basic electro-optic logic circuit shown in FIGURE 1 is adaptable, by mere rotation of the elements, to generate numerous logical functions.

| Polarizer 13 | Electro-Opt. Cryst. | | Retard. Plate 26 | Analyzer 27 | Intensity Function | | | Logical Functions | | | |
|---|---|---|---|---|---|---|---|---|---|---|---|
| | 15 | 16 | | | | | | A | | B | |
| | | | | | | 16 | | 16 | | 16 | |
| x y | x' y' | x' y' | x' y' | x y | 15 | 0 | 1 | 0 | 1 | 0 | 1 |
| A  0 1 | $\phi$ 0 | $\phi$ 0 | $\phi$ 0 | 1 0 | 15  0 | $I/_2$ | I | 1 | 1 | 0 | 1 |
| B  0 1 | $\phi$ 0 | $\phi$ 0 | $\phi$ 0 | 0 1 | 15  0 | $I/_2$ | 0 | 1 | 0 | 0 | 0 |
| | | | | | 1 | 0 | $I/_2$ | 0 | 1 | 0 | 0 |
| C  0 1 | $\phi$ 0 | $\phi$ 0 | 0 0 | 1 0 | 15  0 | 0 | $I/_2$ | 0 | 1 | 0 | 0 |
| | | | | | 1 | $I/_2$ | I | 1 | 0 | 0 | 1 |
| D  0 1 | $\phi$ 0 | $\phi$ 0 | 0 0 | 0 1 | 15  0 | I | $I/_2$ | 1 | 1 | 1 | 0 |
| | | | | | 1 | $I/_2$ | 0 | 1 | 0 | 0 | 0 |
| E  0 1 | $\phi$ 0 | 0 $\phi$ | $\phi$ 0 | 1 0 | 15  0 | $I/_2$ | 0 | 1 | 0 | 0 | 0 |
| | | | | | 1 | I | $I/_2$ | 1 | 1 | 1 | 0 |
| F  0 1 | $\phi$ 0 | 0 $\phi$ | $\phi$ 0 | 0 1 | 15  0 | $I/_2$ | I | 1 | 1 | 0 | 1 |
| | | | | | 1 | 0 | $I/_2$ | 0 | 1 | 0 | 0 |
| G  0 1 | $\phi$ 0 | 0 $\phi$ | 0 0 | 1 0 | 15  0 | 0 | $I/_2$ | 0 | 1 | 0 | 0 |
| | | | | | 1 | $I/_2$ | 0 | 1 | 0 | 0 | 0 |
| H  0 1 | $\phi$ 0 | 0 $\phi$ | 0 0 | 0 1 | 15  0 | I | $I/_2$ | 1 | 1 | 1 | 0 |
| | | | | | 1 | $I/_2$ | I | 1 | 1 | 0 | 1 |

In the logical table above, Y=1 or X=1 again means that the transmission directions of polarizer and analyzer are in the Y or X directions respectively. The symbol $\phi$ indicates that the phase difference in the retardation plates and the active crystals are either in the X' or Y' direction. For the electro-optic active crystals, 15 and 16, the retardation occurs only when the voltage $V\lambda/4$ is applied to these crystals. The columns A and B, under the heading "Logical Functions," indicates that two logical functions can be performed for any particular arrangement of the optical elements. The reason that this is possible is because of the arrangement of the analyzer 27 and the photomultiplier tube 30. For any light passing through analyzer 27, as shown in FIGURE 1, the light will be plane polarized in the X direction. If the light presented to analyzer 27 is plane polarized in the X direction, the intensity of the light at photomultiple tube It should be obvious, that the above-described electro-optic logic circuit is not limited to two active crystals. More than two optic active crystals may be employed, and the possible logical functions which could be generated increases.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intention, therefore, to be limited only as indicated by the scope of the following claims.

What is claimed is:

1. An electro-optic system responsive to selectively applied first and second voltages at first and second inputs for generating an output logically related to the application of said first and second voltages comprising
  (a) a lighter detector,
  (b) means for transmitting light plane polarized in a first direction along a transmission path toward said light detector,
  (c) first and second bodies of electro-optic active materials axially disposed one behind another along said transmission path in a position to receive said plane polarized light,
  (d) means responsive to said selectively applied first and second voltages for energizing said first and second bodies respectively,
  (e) said first and second bodies being oriented in the plane perpendicular to said transmission path to change the incident plane polarized light to circularly polarized light when one and only one of said first and second electro-optic active materials are energized,
  (f) a quarter wave plate positioned along said transmission path to receive light passing through the combination of said first and second bodies, said quarter wave plate being oriented to alter the polarization of said received light from plane to circular or from circular to plane, and
  (g) an analyzer positioned along said transmission path between said quarter wave plate and said detector for passing to said detector only components of incident light radiation which are plane polarized in a predetermined direction.

2. An electro-optic system as claimed in claim 1 wherein said means for energizing said first and second bodies comprises
  (a) a first pair of transparent electrodes on said first body,
  (b) means for applying said first voltage between said first pair of electrodes,
  (c) a second pair of transparent electrodes on said second body, and
  (d) means for applying said second voltage between said second pair of electrodes.

3. An electro-optic system as claimed in claim 2 wherein at least one of said first and second bodies and said quarter wave plate is mounted to be rotatable about the axis of the light wave propagation path.

4. An electro-optic system as claimed in claim 2 wherein said first and second bodies are oriented to have no cumulative effect on the incident plane polarized light when simultaneously energized.

5. An electro-optic system as claimed in claim 2 wherein said first and second bodies are oriented to change the direction of polarization of said incident plane polarized light by 90° when simultaneously energized.

References Cited
UNITED STATES PATENTS

| | | | |
|---|---|---|---|
| 1,670,757 | 5/1928 | Von Bronk | 350—150 |
| 2,788,710 | 4/1957 | West | 350—150 |
| 2,936,380 | 5/1960 | Anderson | 350—150 |
| 3,027,806 | 4/1962 | Koelsch et al. | 350—150 |
| 3,239,671 | 3/1966 | Buhrer | 350—150 |

DAVID SCHONBERG, *Primary Examiner.*

P. R. MILLER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,407,017                          October 22, 1968

Harold Fleisher et al.

It is certified that error appears in the above identified patent and that said Letters Patent are hereby corrected as shown below:

Column 5, in the table, line A should appear as shown below:

| A0 1 | φ 0 | φ 0 | φ 0 | 1 0 | 15 | 0 | $I/2$ | I | 1 | 1 | 0 | 1 |
|---|---|---|---|---|---|---|---|---|---|---|---|---|
|  |  |  |  |  |  | 1 | I | $I/2$ | 1 | 1 | 1 | 0 |

Signed and sealed this 10th day of March 1970.

(SEAL)
Attest:

Edward M. Fletcher, Jr.                     WILLIAM E. SCHUYLER, JR.
Attesting Officer                             Commissioner of Patents